United States Patent
Dolan et al.

(10) Patent No.: US 10,861,428 B2
(45) Date of Patent: Dec. 8, 2020

(54) TECHNOLOGIES FOR GENERATING A MUSICAL FINGERPRINT

(71) Applicant: QRS MUSIC TECHNOLOGIES, INC., Seneca, PA (US)

(72) Inventors: Thomas A. Dolan, Hendersonville, TN (US); Jarrod Cook, Pittsburgh, PA (US); Aaron Yost, Seneca, PA (US); Daniel Shirey, Oil City, PA (US); Parker Welch, Oil City, PA (US)

(73) Assignee: QRS MUSIC TECHNOLOGIES, INC., Seneca, PA (US)

( * ) Notice: Subject to any disclaimer, the term of this patent is extended or adjusted under 35 U.S.C. 154(b) by 2 days.

(21) Appl. No.: 16/244,977

(22) Filed: Jan. 10, 2019

(65) Prior Publication Data

US 2019/0213989 A1 Jul. 11, 2019

Related U.S. Application Data

(60) Provisional application No. 62/615,719, filed on Jan. 10, 2018.

(51) Int. Cl.
  *G10H 1/00* (2006.01)
  *G10G 1/00* (2006.01)
  *G06F 3/0482* (2013.01)
  *G06Q 50/00* (2012.01)
  *G06N 20/00* (2019.01)

(52) U.S. Cl.
  CPC ......... *G10H 1/0008* (2013.01); *G06F 3/0482* (2013.01); *G06N 20/00* (2019.01); *G06Q 50/01* (2013.01); *G10G 1/00* (2013.01); *G10H 1/0058* (2013.01); *G10H 2210/071* (2013.01); *G10H 2210/076* (2013.01); *G10H 2210/091* (2013.01); *G10H 2220/015* (2013.01); *G10H 2220/091* (2013.01); *G10H 2240/075* (2013.01); *G10H 2240/081* (2013.01); *G10H 2240/101* (2013.01); *G10H 2240/105* (2013.01)

(58) Field of Classification Search
  CPC .... G10H 1/0008; G10H 1/0058; G06N 20/00; G06F 3/0482; G06Q 50/01; G10G 1/00
  USPC ........................................................ 84/453
  See application file for complete search history.

(56) References Cited

U.S. PATENT DOCUMENTS 4,957,031 A    9/1990  Kondo
4,993,306 A    2/1991  Ueta
(Continued)

FOREIGN PATENT DOCUMENTS

EP        3067883         9/2016
EP        3067883 A1 *    9/2016   ............. G10H 3/181
WO    WO 2015/085092      6/2015

OTHER PUBLICATIONS

Search Report & Written Opinion issued in Int'l Appl. No. PCT/US2019/013075 (dated 2019).

*Primary Examiner* — David S Warren
*Assistant Examiner* — Christina M Schreiber
(74) *Attorney, Agent, or Firm* — Barnes & Thornburg LLP

(57) ABSTRACT

Techniques are described herein for generating a music fingerprint representative of a performance style of an individual. One or more characteristics associated with musical data are identified. A score to associated with each of the identified one or more characteristics is determined. The music fingerprint is generated based on the determine score for each of the identified one or more characteristics.

20 Claims, 5 Drawing Sheets

(56) References Cited

U.S. PATENT DOCUMENTS

| | | | |
|---|---|---|---|
| 6,374,260 B1 | 4/2002 | Hoffert | |
| 7,028,082 B1* | 4/2006 | Rosenberg | H04H 60/02 |
| | | | 707/999.104 |
| 8,280,889 B2* | 10/2012 | Whitman | G06F 16/68 |
| | | | 707/741 |
| 8,407,224 B2* | 3/2013 | Bach | G06F 16/637 |
| | | | 707/737 |
| 9,471,673 B1* | 10/2016 | Sharifi | G10L 25/54 |
| 9,786,298 B1* | 10/2017 | Greene | G10L 25/54 |
| 10,474,422 B1 | 11/2019 | Venti | |
| 2003/0167904 A1* | 9/2003 | Itoh | G10H 1/0033 |
| | | | 84/609 |
| 2006/0206582 A1 | 9/2006 | Finn | |
| 2007/0163428 A1* | 7/2007 | Salter | G10H 1/0058 |
| | | | 84/611 |
| 2008/0271592 A1 | 11/2008 | Beckford | |
| 2009/0056525 A1* | 3/2009 | Oppenheimber | G06F 16/639 |
| | | | 84/609 |
| 2009/0164034 A1 | 6/2009 | Cohen | |
| 2009/0254836 A1* | 10/2009 | Bajrach | G11B 27/031 |
| | | | 715/745 |
| 2009/0255395 A1 | 10/2009 | Humphrey | |
| 2010/0250585 A1* | 9/2010 | Hagg | G06F 16/70 |
| | | | 707/769 |
| 2010/0257005 A1* | 10/2010 | Phenner | G06Q 30/04 |
| | | | 705/68 |
| 2013/0018496 A1 | 1/2013 | Littlejohn | |
| 2013/0074678 A1* | 3/2013 | Iwadate | G09B 7/02 |
| | | | 84/470 R |
| 2013/0259211 A1* | 10/2013 | Vlack | G06F 16/683 |
| | | | 379/88.01 |
| 2014/0052282 A1 | 2/2014 | Balassanian | |
| 2014/0129235 A1* | 5/2014 | Suvanto | G10L 21/06 |
| | | | 704/276 |
| 2015/0268847 A1* | 9/2015 | Lane | G06F 16/638 |
| | | | 715/716 |
| 2015/0302086 A1* | 10/2015 | Roberts | G06F 16/683 |
| | | | 707/771 |
| 2015/0319479 A1 | 11/2015 | Mishra | |
| 2015/0373455 A1* | 12/2015 | Donaldson | G10L 25/87 |
| | | | 381/79 |
| 2016/0086609 A1* | 3/2016 | Yue | G10L 15/22 |
| | | | 704/239 |
| 2016/0189249 A1 | 6/2016 | Meyer | |
| 2016/0231834 A1 | 8/2016 | Hardi | |
| 2016/0275107 A1* | 9/2016 | Goodwin | G06K 9/628 |
| 2017/0017729 A1* | 1/2017 | Jamal-Syed | H04M 1/2477 |
| 2017/0090860 A1 | 3/2017 | Gehring | |
| 2017/0092245 A1 | 3/2017 | Kozielski | |
| 2017/0147830 A1 | 5/2017 | Park | |
| 2017/0228531 A1* | 8/2017 | Raji | G06F 21/31 |
| 2017/0289202 A1 | 10/2017 | Krasadakis | |
| 2018/0053261 A1* | 2/2018 | Hershey | G06Q 50/01 |
| 2018/0061382 A1 | 3/2018 | Summers | |
| 2018/0130469 A1* | 5/2018 | Gruenstein | G10L 15/30 |
| 2018/0137845 A1 | 5/2018 | Prokop | |
| 2018/0139268 A1* | 5/2018 | Fuzell-Casey | G06F 16/78 |
| 2018/0174559 A1 | 6/2018 | Elson | |
| 2018/0233119 A1 | 8/2018 | Patti | |
| 2018/0260481 A1 | 9/2018 | Rathod | |
| 2019/0141079 A1 | 5/2019 | Vidas | |
| 2019/0147849 A1* | 5/2019 | Taiwan | G06F 40/56 |
| | | | 704/258 |
| 2019/0213989 A1* | 7/2019 | Dolan | G10H 1/0008 |
| 2019/0272834 A1* | 9/2019 | Brenner | G10L 25/51 |
| 2020/0019567 A1 | 1/2020 | Moo | |
| 2020/0051460 A1* | 2/2020 | Bedor | G09B 5/065 |
| 2020/0168192 A1* | 5/2020 | Silverstein | G10H 1/368 |

* cited by examiner

TECHNOLOGIES FOR GENERATING A MUSICAL FINGERPRINT

CROSS-REFERENCE TO RELATED APPLICATIONS

The present application claims the benefit of U.S. Provisional Patent Application No. 62/615,719, filed Jan. 10, 2018. The disclosure set forth in the referenced application is incorporated herein by reference in its entirety.

FIELD

The present disclosure relates to music technology, and more specifically, to a mobile music controller device for generating a musical fingerprint representative of a musical performance style of an individual.

BACKGROUND

Various technologies allow music performers (e.g., professional musicians, student musicians, amateur musicians, and the like) to track and record performances. For example, a keyboardist may record a practice session by connecting an electronic keyboard to a computing device and playing music on the keyboard. Computer software may capture the performance and output a variety of files, such as audio output, music data (e.g., Music Instrument Digital Instrument (MIDI)-formatted data), and the like.

However, current equipment may be impractical or insufficient for a music performer. For example, a traveling music performer may wish to track a progression of a performance of a musical piece but lack equipment or software to adequately capture the performance (e.g., travel constraints may prohibit the performer from transporting suitable recording equipment). As another example, existing software may be inadequate in guiding an individual (e.g., a music student) in becoming more proficient in a given musical instrument. That is, some software may merely provide playback of a recorded practice session to a student, which offers limited guidance.

SUMMARY

Embodiments presented herein disclose techniques for tracking and analyzing music activity. For example, one embodiment discloses a method for generating a music fingerprint representative of a performance style of an individual. The method generally includes identifying, by one or more processors, one or more characteristics associated with musical data. The method also includes determining a score to associate with each identified one or more characteristics. The method also generally includes generating a music fingerprint based on the determined score for each of the identified one or more characteristics.

Another embodiment discloses a computer-readable storage medium having a instructions, which, when executed on a processor, performs an operation for generating a music fingerprint representative of a performance style of an individual. The operation itself generally includes identifying, by one or more processors, one or more characteristics associated with musical data. The operation also includes determining a score to associate with each identified one or more characteristics. The operation also generally includes generating a music fingerprint based on the determined score for each of the identified one or more characteristics.

Yet another embodiment discloses a system having a processor and a memory storing program code, which, when executed on the processor, performs an operation for generating a music fingerprint representative of a performance style of an individual. The operation itself generally includes identifying, by one or more processors, one or more characteristics associated with musical data. The operation also includes determining a score to associate with each identified one or more characteristics. The operation also generally includes generating a music fingerprint based on the determined score for each of the identified one or more characteristics.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
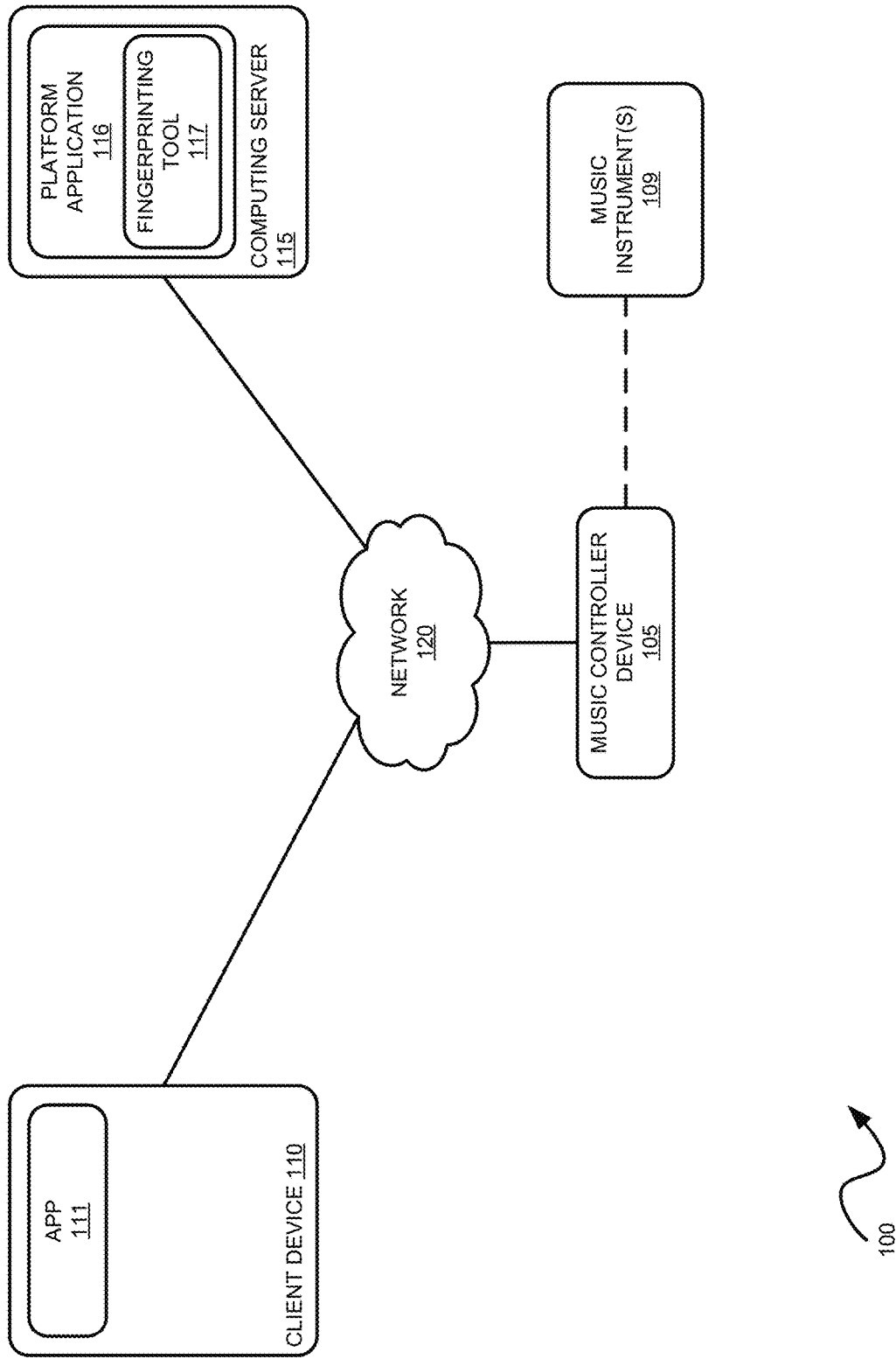
FIG. 1 illustrates an environment in which a music controller device operates, according to an example embodiment.

FIG. 1 illustrates an example environment 100, according to an example embodiment. As shown, the environment 100 includes a music controller device 105, a client device 110, and a computing server 115, each interconnected via a network 120 (e.g., the Internet).

In an example embodiment, the music controller device 105 is representative of a mobile controller and tracker device that tracks and stores music activity, converts the music activity to various formats (e.g., audio formats, notation formats, musical interface formats, etc.), and generates analytics of music activity, e.g., on behalf of a user (e.g., a musician, student, hobbyist, and so on). Music activity may include audio input from music instruments 109 connected with the music controller device 105 (e.g., electronic keyboards, synthesizers, guitars, etc.) through an electronic communications interface, such as MIDI (Musical Instrument Digital Interface), audio input from music instruments/devices 109 recorded by audio capture components (e.g., microphones, audio recorder devices, etc.) coupled with the music controller device 105, digital audio input, notation software activity, and the like. The music controller device 105 provides a variety of hardware components, such as speaker components, ports for connecting peripheral devices (e.g., Universal Serial Bus (USB) ports), I/O interface ports (e.g., MicroSD ports, microphones, Bluetooth MIDI, WiFi audio line in/out, etc.), metronome components, and the like. The music controller device 105 also provides a variety of software components for capturing audio (e.g., music performances), storing the audio and other data thereon, and transmitting the audio and other data to a music service platform (e.g., a platform application 116 executing on the computing server 115) or devices associated with a given user.

The client device 110 may be embodied as a physical computer (e.g., a desktop computer, laptop computer, or mobile device such as a tablet, smartphone, etc.) or a virtual computing instance in a cloud network. Illustratively, the client device 110 includes an app 111, which is representative of a graphical user interface for a user of the music controller device 105. The app 111 may also be part of a music service platform, where the app 111 may transmit musical data and user inputs to the platform application 116. The app 111 may upload and retrieve data to and from (respectively) either the music controller device 105 directly or from a platform service running on the cloud (e.g., platform application 116 executing on the computing server 115). The app 111 may provide playback and local analysis for data received from the music controller device 105 (e.g., audio data representative of a performance using a music instrument 109). The app 111 may establish a wireless connection (e.g., a Bluetooth connection) with the platform application 116 (and/or the music controller device 105) to enable the app 111 to receive, via the wireless connection, performance data, music tracker data, and analytics from the music controller device 105. The GUI of the app 111 may also allow a user to provide inputs to associate with musical data. For example, the GUI may provide one or more data fields for categorizing musical data representative of a performance.

The computing server 115 may be representative of a physical computer (e.g., a desktop computer, workstation computer, laptop or tablet computer, etc.) or a virtual computing instance in a cloud network. In some embodiments, the computer server 115 may be a cloud resource providing a software platform for the music controller device 105. More particularly, as shown, the computing server 115 includes a platform application 116. The computing server 115 may be one of many servers providing the platform application 116. The platform application 116 is representative of software providing a music service platform that interfaces with the music controller device 105 and the app 111. For example, the platform application 116 may obtain musical data automatically from a music controller device 105 upon completion of a performance recording by the music controller device 105. The platform application 116 may receive data from a given music controller device 105 (e.g., audio data) or app 111 on a client device 110. The platform application 116 may then perform various actions on the data, such as tracking, analytics, and the like.

For example, the platform application 116 receives audio input representative to a musical performance and generates metadata categorizing the musical performance. The platform application 116 may also receive additional input from a user to assist in categorizing the musical performance. For example, once received, the platform application 116 may assign a distinct identifier to the audio input, which is also referred to herein as a piece. The platform application 116 may assign tags over a timeline of the piece, such as the date of performance, time of day of the performance, and the instrument used (e.g., as connected to the music controller device 105). Further, the platform application 116 may generate (or retrieve) additional variables, such as length of a given performance, genre of the performance, a musical instrument (or instruments) connected with the music controller device 105 or otherwise used during the performance, and the like. In addition, the platform application 116 may also receive data obtained from sensors connected with the music controller device 105 (e.g., camera device, heart rate monitors, brain wave sensors, optical sensors, etc.). The platform application 116 is also configured to transmit, via the network 120 over a wired or wireless connection, the audio input and associated metadata to a user device (e.g., to the app 111) or to the music controller device 105. As another example, the platform application 116 may identify correlations in captured musical data (e.g., audio data, metadata associated with the audio data, and the like) and generate analytics based on the correlations.

Illustratively, the platform application 116 includes a fingerprinting tool 117. As further described herein, the fingerprinting tool 117 generates, from audio data received from the music controller device 105, a music fingerprint indicative of one or more characteristics of a performance by a distinct user. For instance, the fingerprinting tool 117 may receive audio input representative of a music session (e.g., from one of the music instruments 109 as captured by the music controller device 105) from the music controller device 105. The fingerprinting tool 117 may also receive sensor data relating to the audio input to the platform application 116 (e.g., data obtained from wearable devices), which in turn evaluates the received inputs for consistencies in timing, energy, patterns, and overall style of the performance and, as a function of the observed consistencies, attribute a music fingerprint to the user.

The fingerprinting tool 117 may use a variety of sensors and input to obtain other input associated with the performance. For instance, the fingerprinting tool 117 may evaluate optical sensors to capture finger movement or breathing patterns, sensors to observe various biometrics (e.g., heart rate, brainwaves, breathing, etc.), tempo data, MIDI data, etc. For example, the fingerprinting tool 117 may observe, via audio input, how certain notes of a predefined musical piece are played by the user, such as left hand and right hand timing relative to the piece. Further, over time, the fingerprinting tool 117 may, based on artificial intelligence (AI) and machine learning-based techniques, refine a given music fingerprint given additional input associated with the user (e.g., subsequent performances of the same musical piece, subsequent performances of different piece, other varieties of input data, other varieties of sensor data, various musical and sensor input at different points in the day, etc.). In some embodiments, the fingerprinting tool 117 may store a generated fingerprint in a variety of formats (e.g., using a code such as a Q-code to unlock a fingerprinting algorithm, a markup language such as the Extensible Markup Language (XML), a Comma Separated Values (CSV) file, and the like).

In some embodiments, the music controller device 105 (or the app 111) may retrieve a given music fingerprint and use the music fingerprint in a variety of manners. For example, the music controller device 105, via playback software provided thereon, may apply a given music fingerprint and automate the performance of a predefined music piece (e.g., sheet music) in the style of the user associated with the music fingerprint. In addition, a user may obtain a music fingerprint associated with another music performer and automate the performance of a music piece using the music fingerprint. Doing so allows the automation to be performed in the style of the music performer, as a function of the music fingerprint. Doing so further allows the user to compare playing styles between music fingerprints. Further, the platform application 116 may generate analytics data based on one or more music fingerprints. For example, the platform application 116 may evaluate timing characteristics of a music fingerprint associated with a given user compared with a music fingerprint associated with a music artist and present the comparison to the user, such as by displaying analytics to the app 111.

Note, although FIG. 1 depicts the platform application 116 as performing the functions of the fingerprinting tool 117, one of skill in the art may recognize that the functions performed by the fingerprinting tool 117 may be carried out on devices separate from (or in addition to) the computing server 115. For example, the app 111 may include logic for receiving audio data from the music controller device 105 and generating a music fingerprint to associate with a user. For instance, the app 111 may receive musical data from the music controller device 105, generate metadata associated with the musical data, and generate analytics based identified correlations. Based on such information and variables, the app 111 may generate the music fingerprint associated with the user.

Figure 2:
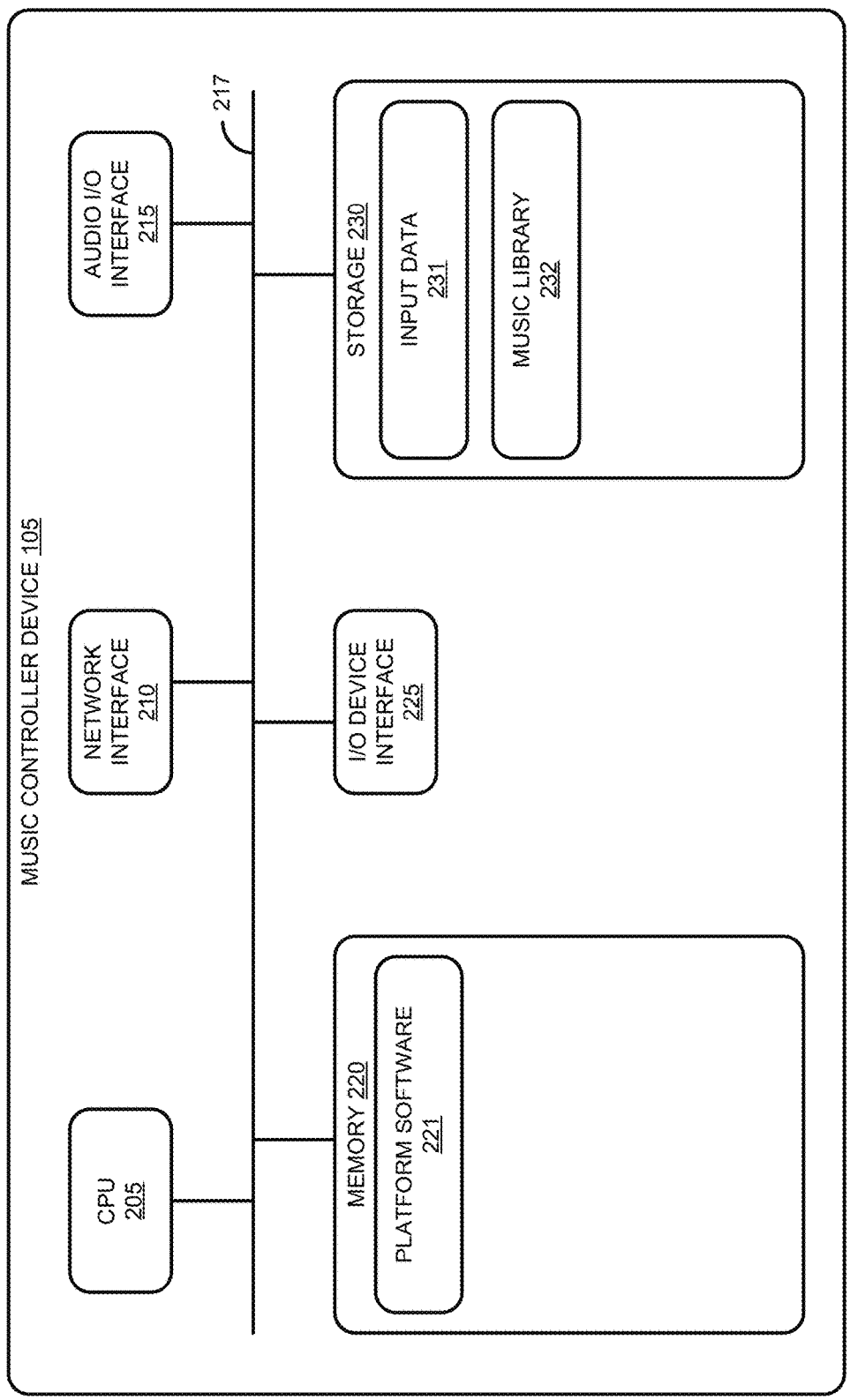
FIG. 2 further illustrates the music controller device described relative to FIG. 1, according to an example embodiment.

FIG. 2 further illustrates the music controller device 105, according to an example embodiment. As shown, the music controller device 105 includes a central processing unit (CPU) 205, a network interface 210, an audio input/output (I/O) interface 215, a memory 220, an I/O device interface 225, and a storage 230, each interconnected via a hardware bus 217. In practice, an actual music controller device 105 will include a variety of additional hardware components not shown. For example, the music controller device 105 includes MIDI I/O and wireless communication I/O interfaces that facilitate communication with MIDI and wireless devices, respectively. As another example, the music controller device 105 may include a display for video output (e.g., for playback of a video received from a device such as client device 110) or provide recording components for video (e.g., a camera). Further, the music controller device 105 may include a sound engine used to process audio input and to generate output signals representing audio.

The CPU 205 retrieves and executes programming instructions stored in the memory 220. Similarly, the CPU 205 stores and retrieves input data 231 and data from a music library 232 residing in the storage 230. The hardware bus 217 is used to transmit instructions and data between the CPU 205, storage 230, network interface 210, audio I/O interface 215, I/O device interface 225, and the memory 230. CPU 205 is included to be representative of a single CPU, multiple CPUs, a single CPU having multiple processing cores, and the like. The memory 220 is generally included to be representative of memory and storage on a portable device, e.g., DDR and flash memory spaces. The audio I/O interface 215 communicates audio-in and -out data captured by audio devices connecting with the interface 215 via one or more ports (not shown) to and from the music controller device 105. The I/O device interface 225 communicates data transmitted via one or more ports (e.g., USB ports, serial ports, etc.) for peripheral devices.

The network interface 210 may be embodied as any hardware, software, or circuitry used to connect the music controller device 105 over a network, e.g., to communicate with the client device 110 and the computing server 115. In addition, the network interface 210 supports peer-to-peer connection (e.g., with other music controller devices 105) and long distance communication protocols to communicate with other networked devices.

Illustratively, the memory 220 includes platform software 221. The platform software 221 includes application programming interfaces (APIs) for allowing the app 111 (or third-party applications) to use the music service platform. The platform software 221 also includes various tools, widgets and applications (e.g., third-party applications) using the various components of the music controller device 105. For instance, the tools, widgets, and applications may be configured to perform other functions associated with the music controller device 105, such as metronome functions, key-tuning functions, and the like. The platform software 221 may also include software for evaluating a music fingerprint data (e.g., for playing back a music file in the style of an underlying individual).

Figure 3:
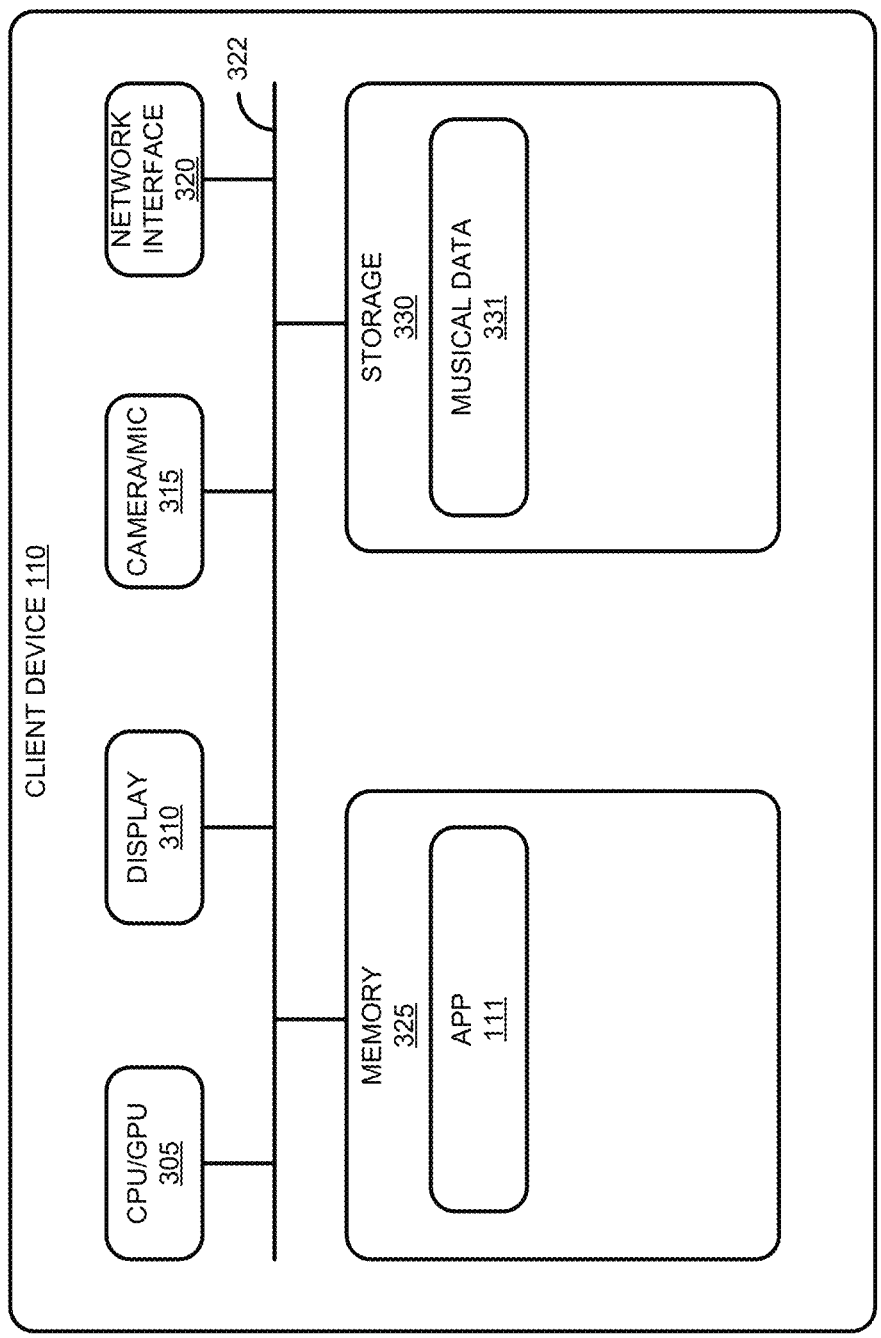
FIG. 3 further illustrates the client device described relative to FIG. 1, according to an example embodiment.

FIG. 3 further illustrates the client device 110, according to an example embodiment. As shown, the client device 110 includes, without limitation, a central processing unit and graphics processing unit (CPU/GPU) 305, a display 310, a camera/microphone 315, a network interface 320, a memory 325, and a storage 330, each interconnected via a hardware bus 322. Of course, an actual client device 110 will include a variety of additional hardware components.

The CPU/GPU 305 retrieves and executes programming instructions stored in the memory 325. Similarly, the CPU/GPU 305 stores and retrieves musical data 331 residing in the storage 330. The hardware bus 322 is used to transmit instructions and data between the CPU/GPU 305, storage 330, network interface 320, and the memory 325. CPU/GPU 305 is included to be representative of a single CPU, multiple CPUs, a single CPU having multiple processing cores, and the like. The memory 325 is generally included to be representative of memory and storage on a mobile device, e.g., DDR and flash memory spaces.

Illustratively, the memory 325 includes the app 111. The storage includes musical data 331 indicative of data associated with one or more music performances transmitted over a network from the music controller device 105. The app 111 may receive, from the music controller device 105, the musical data 331 via a wired or wireless connection (e.g., Bluetooth connection, Wi-Fi connection, etc.). In addition, the app 111 may receive, from the platform application 116, additional musical data 331 associated with performance data sent from the music controller device 105. For example, the app 111 may receive additional analytics generated by the platform application 116 for a given set of performance data. As another example, the app 111 may receive music fingerprint data associated with a user (or other individual). The app 111 may also playback music files (e.g., MIDI files or other music format including predefined music) based on a music fingerprint associated with the user (or other individual). Further, the app 111 may present the data to a user via a graphical user interface or a web-based interface (e.g., with the data and web content provided by the platform application 116).

Figure 4:
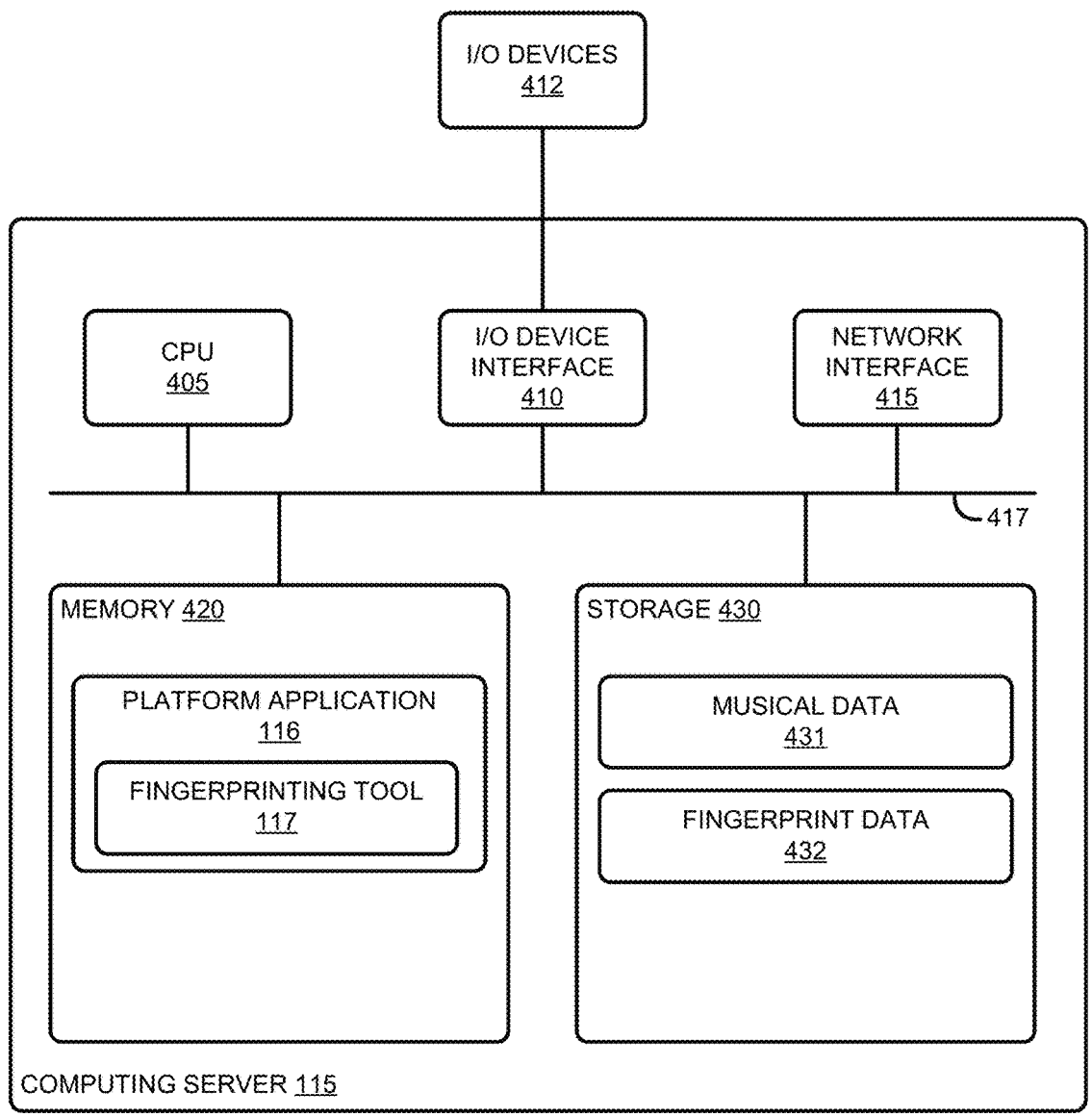
FIG. 4 further illustrates the computing server described relative to FIG. 1, according to an example embodiment.

FIG. 4 further illustrates the computing server 115, according to an example embodiment. As shown, the computing server 115 includes, without limitation, a central processing unit (CPU) 405, an I/O device interface 410, a network interface 415, a memory 420, and a storage 430, each interconnected via an interconnect bus 417. Note, CPU 405 is included to be representative of a single CPU, multiple CPUs, a single CPU having multiple processing cores, and the like. Memory 420 is generally included to be representative of a random access memory. Storage 430 may be a disk drive storage device. Although shown as a single unit, storage 430 may be a combination of fixed and/or removable storage devices, such as fixed disc drives, removable memory cards, or optical storage, network attached storage (NAS), or a storage area network (SAN). The I/O device interface 410 may provide a communications interface between the computing server 115 and I/O devices 412.

Illustratively, the memory 420 includes the platform application 116. The storage 430 includes musical data 431 and fingerprint data 432. The platform application 116 receives musical data 431 associated with a given user from a client, such as the app 111 executing on the client device 110 or the music controller device 105. The platform application 116 is configured to receive input data 231 and generate metadata categorizing the input data 231 (e.g., user, instrument type, duration of a performance, etc.). The platform application 116 also identifies correlations in the input data 231 and generates analytics based on the correlations. The platform application 116 may transmit the analytics to the app 111 for display to a user. The platform application may generate metadata to assign to the musical data 431 and also generate analytics based, at least in part, on the metadata. The platform application 116 may also store the musical data 431 by user (or user group). The memory 420 may also include additional applications and data used in conjunction with (or separate from) the platform application 116. In addition, the platform application includes the fingerprinting tool 117. As stated, the fingerprinting tool 117 is configured to generate a music fingerprint indicative of a playing style of a given user based on input data 231 provided by a user (e.g., a capture of a performance of a predefined music piece of the music library 232

Figure 5:
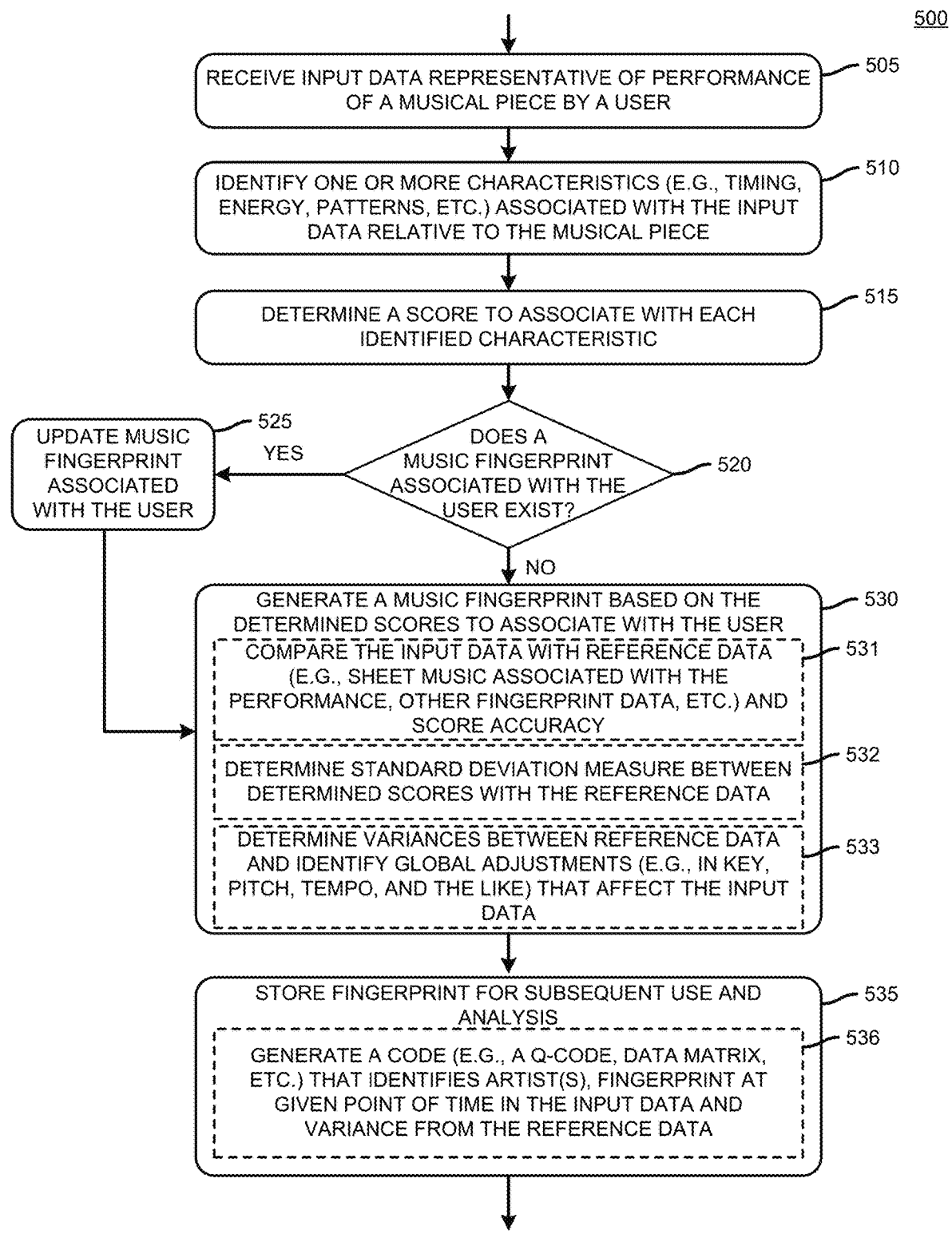
FIG. 5 illustrates an example method for generating a music fingerprint to associate with a user, according to an example embodiment.

FIG. 5 illustrates an example method 500 for generating a music fingerprint to associate with a user, according to an example embodiment. At step 505, the fingerprinting tool 117 receives, such as from the music controller device 105 or the app 111, input data representative of a performance of a musical piece by a user. For example, the input data may include an audio capture of the performance, data obtained from sensors (e.g., optical sensors, heartrate monitors, brainwave sensors, etc.), MIDI data, etc., sent by the music controller device 105. The input data may also indicate reference data, such as a predefined music piece performed by the user (e.g., uploaded as a sheet music file to the platform application 116). At step 510, the fingerprinting tool 117 identifies one or more characteristics associated with the input data relative to the reference data. For example, the characteristics include timing, energy, patterns, and the like. At step 515, the fingerprinting tool 117 determines a value to associate with each identified characteristic. The fingerprinting tool 117 may generate a matrix that includes each of the scores respective to a characteristic.

At step 520, the fingerprinting tool 117 determines whether a music fingerprint associated with the user already exists. For example, to do so, the fingerprinting tool 117 may evaluate a database (e.g., connected with the computing server 115) using various parameters as a lookup, such as a score range for one or more variables or a user identifier. If so, then at step 525, the platform application 116 updates the music fingerprint associated with the user. For example, if values are available for variables that were not previously included with a previous fingerprint, the platform application 116 may include the values for the newly added variables with the preexisting fingerprint, providing a more robust music fingerprint to associate with the user.

Otherwise, at step 530, the fingerprinting tool 117 generates a music fingerprint based on the determined values and associates the music fingerprint with the user. To do so, for example, the fingerprinting tool 117 may, at step 531, compare input data with reference data. As stated, reference data may include a predefined music piece performed by the user. The reference data may also include predefined sheet music formatted to be readable by the fingerprinting tool 117, other fingerprint data, and the like. Further, the fingerprinting tool 117 may create a waveform timeline of the input data and another waveform timeline of the reference data. At step 532, the fingerprinting tool 117 may determine a standard deviation measure between the determined scores with associated scores of the reference data. More particularly, the fingerprinting tool 117 measures the accuracy of the scores. Further, at step 533, the fingerprinting tool 117 may determine other variance measures between the recorded input data and the reference data. In addition, the fingerprinting tool 117 identifies global adjustments to be made to the resulting fingerprint (e.g., characteristics in the input data that differ from the reference data including key, pitch, tempo, and the like). Based on this information, the fingerprinting tool 117 compares the waveform data of the adjusted input data and the reference data. The fingerprinting tool 117 may also build a profile that includes the identified characteristics and scores. The profile may be customized (e.g., via the app 111) to determine which of the characteristics and scores are included with the music fingerprint. In creating the fingerprint, the fingerprinting tool 117 applies the characteristics (e.g., the identified variables) obtained from the input data to the reference data. The fingerprint, as applied to the reference data, should produce output that resembles the reference data as if performed by the individual. Over time, as additional variables are included with the fingerprint, the more accurate that the fingerprint resembles that of the individual associated therewith.

Further, the platform application 116 may generate a file (e.g., a Q-code, an XML file, CSV file, image file, etc.) representative of the music fingerprint. The file may include the identified variables.

At step 535, the platform application 116 stores the generated (or updated) fingerprint for subsequent use and analysis. For instance, at step 536, as described above, platform application 116 may generate a code (e.g., a Q-code, a data matrix, markup language file, and the like) that identifies an individual (e.g., the user of the music controller device 105, an artist, or some other individual), and variances from the reference data at given points in time associated with the input data.

For instance, the platform application 116 may transmit the fingerprint to the music controller device 105 for storage. In addition, the platform application 116 may subsequently aggregate the music fingerprint for further use (e.g., making the fingerprint available to authorized users).

An example of carrying out the generation of a music fingerprint is as follows.

1.) The fingerprinting tool 117 groups playback variables based on types of input (e.g., audio input, sensor input, MIDI input, etc.). Each major group defines a type of sensing and can have one or more subgroups, where each subgroup corresponds to one or more sensors. Each group, subgroup, and sensor is assigned an identifier (e.g., a unique numerical identifier).

2.) The fingerprinting tool 117 measures the fingerprint based on a scoring in each of one or more predefined fields, where the scoring is indicative of a likelihood that the inputs apply to that field.

3.) The fingerprinting tool 117 extrapolates standards and applies the extrapolated standards to each piece of predefined music (e.g., sheet music). As a result, even if a tempo for a given piece is preset at a particular value (e.g., 60 beats per minute (bpm)) and the standard is 120 bpm, the platform application 116 accounts for the variance.

4.) When a user performs a piece, the fingerprinting tool 117 tracks a variable (e.g., tempo) over time relative to the standards. Doing so allows the fingerprinting tool 117 to establish a pattern for that variable. As additional pieces of different types are provided by the user, the fingerprinting tool 117 can establish correlations between standard and actual variations in the variables. The fingerprinting tool 117 may use the correlations to identify tendencies of the user for various types of music. Given additional data, the fingerprinting tool 117 may use machine learning and AI techniques to refine the correlations and identified tendencies of the user. For example, the music fingerprint generated by the fingerprinting tool 117 may be represented as a matrix containing a variety of values, each value corresponding to a given variable group, subgroup, sensor, and/or correlation. The matrix can grow as the number of inputs can grow. The fingerprint includes all variable possibilities and is assigned a standard non-gathered data value. The value is associated to a completeness of a fingerprint as variables are added. The value may change, though the resulting underlying fingerprint may remain unchanged.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for generating a music fingerprint representative of a performance style of an individual, comprising:
   identifying, by one or more processors, one or more characteristics associated with musical data obtained from audio of a musical performance by a user;
   determining a score to associate with each identified one or more characteristics; and
   generating a music fingerprint of the user based on the determined score for each of the identified one or more characteristics, the music fingerprint representing a performance style of the user defined by the determined score of each of the identified one or more characteristics.

2. The computer-implemented method of claim 1, wherein the music fingerprint is generated based on a predefined metric of the one or more characteristics.

3. The computer-implemented method of claim 1, further comprising receiving input data representative of the musical performance.

4. The computer-implemented method of claim 1, further comprising storing the music fingerprint for subsequent use.

5. The computer-implemented method of claim 1, wherein generating the music fingerprint comprises:
   determining one or more variance measures relative to the determined score; and
   generating a code that identifies an individual associated with the musical data and the one or more variance measures relative to points in time of the musical data.

6. The computer-implemented method of claim 1, further comprising:
   identifying the user associated with the music fingerprint; and
   determining whether the user is associated with a second music fingerprint.

7. The computer-implemented method of claim 6, further comprising:
   performing one or more machine learning techniques on the second music fingerprint based on the generated music fingerprint.

8. A computer-readable storage medium comprising instructions, which, when executed on a processor, performs an operation for generating a music fingerprint representative of a performance style of an individual comprising:
   identifying, by one or more processors, one or more characteristics associated with musical data obtained from audio of a musical performance by a user;
   determining a score to associate with each identified one or more characteristics; and
   generating a music fingerprint of the user based on the determined score for each of the identified one or more characteristics, the music fingerprint representing a performance style of the user defined by the determined score of each of the identified one or more characteristics.

9. The computer-readable storage medium of claim 8, wherein the music fingerprint is generated based on a predefined metric of the one or more characteristics.

10. The computer-readable storage medium of claim 8, further comprising receiving input data representative of the musical performance.

11. The computer-readable storage medium of claim 8, further comprising storing the music fingerprint for subsequent use.

12. The computer-readable storage medium of claim 8, wherein generating the music fingerprint comprises:
   determining one or more variance measures relative to the determined score; and
   generating a code that identifies an individual associated with the musical data and the one or more variance measures relative to points in time of the musical data.

13. The computer-readable storage medium of claim 8, wherein the operation further comprises:
   identifying the user associated with the music fingerprint; and
   determining whether the user is associated with a second music fingerprint.

14. The computer-readable storage medium of claim 13, wherein the operation further comprises:
   performing one or more machine learning techniques on the second music fingerprint based on the generated music fingerprint.

15. A system, comprising:
   a processor, and
   a memory storing program code, which, when executed on the processor, performs an operation for generating a music fingerprint representative of a performance style of an individual comprising:
      identifying, by one or more processors, one or more characteristics associated with musical data obtained from audio of a musical performance by a user;
      determining a score to associate with each identified one or more characteristics; and
      generating a music fingerprint of the user based on the determined score for each of the identified one or more characteristics, the music fingerprint representing a performance style of the user defined by the determined score of each of the identified one or more characteristics.

16. The system of claim 15, wherein the music fingerprint is generated based on a predefined metric of the one or more characteristics.

17. The system of claim 15, further comprising receiving input data representative of the musical performance.

18. The system of claim 15, further comprising storing the music fingerprint for subsequent use.

19. The system of claim 15, wherein generating the music fingerprint comprises:
   determining one or more variance measures relative to the determined score; and
   generating a code that identifies an individual associated with the musical data and the one or more variance measures relative to points in time of the musical data.

20. The system of claim 15, wherein the operation further comprises:
   identifying the user associated with the music fingerprint;
   determining whether the user is associated with a second music fingerprint; and
   performing one or more machine learning techniques on the second music fingerprint based on the generated music fingerprint.

\* \* \* \* \*